(12) United States Patent
Chen

(10) Patent No.: US 7,012,408 B2
(45) Date of Patent: Mar. 14, 2006

(54) ELECTRONIC APPARATUS CAPABLE OF EFFECTIVELY USING POWER OF AN AC/DC ADAPTOR

(75) Inventor: Sheng-Feng Chen, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 127 days.

(21) Appl. No.: 10/720,332

(22) Filed: Nov. 25, 2003

(65) Prior Publication Data
US 2005/0007798 A1  Jan. 13, 2005

(30) Foreign Application Priority Data
Jul. 7, 2003 (TW) .............................. 92118536 A

(51) Int. Cl.
*H01M 10/46* (2006.01)
(52) U.S. Cl. ...................................... 320/152; 320/162
(58) Field of Classification Search ................ 320/152, 320/162; 713/300
See application file for complete search history.

(56) References Cited

U.S. PATENT DOCUMENTS

| | | | | |
|---|---|---|---|---|
| 4,916,329 A | * | 4/1990 | Dang et al. | 307/66 |
| 5,677,615 A | * | 10/1997 | Takano et al. | 320/152 |
| 5,783,998 A | * | 7/1998 | Nakajou et al. | 340/636.15 |
| 6,842,708 B1 | * | 1/2005 | Odaohhara | 702/63 |
| 6,895,516 B1 | * | 5/2005 | Odaohhara | 713/300 |

* cited by examiner

*Primary Examiner*—Bao Q. Vu
(74) *Attorney, Agent, or Firm*—Rabin & Berdo, P.C.

(57) ABSTRACT

An electronic apparatus capable of effectively using power of an AC/DC adaptor including a host and an AC/DC adaptor is provided. The AC/DC adaptor is used for receiving an AC power and converting it into a DC power for the host. At the same time, the AC/DC adaptor outputs a controlling signal to control the power consumption of the host according to the power output at that time. The AC/DC adaptor includes a switching power converter for converting the AC power into the DC power, and a power supply controller for outputting a controlling signal according to the power output by the switching power converter.

14 Claims, 3 Drawing Sheets

ELECTRONIC APPARATUS CAPABLE OF EFFECTIVELY USING POWER OF AN AC/DC ADAPTOR

This application claims the benefit of Taiwan application Serial No. 92118536, filed Jul. 7, 2003.

BACKGROUND OF THE INVENTION

1. Field of the Invention

The invention relates in general to an electronic apparatus, and more particularly to an electronic apparatus capable of effectively using power output by an AC/DC adaptor.

2. Description of the Related Art

Typical electronic apparatus, such as a notebook computer, requires an AC/DC adaptor for supplying a DC power during its operation. Generally speaking, in addition to an in-constructed battery, the AC/DC adaptor is also an important power source for the electronic apparatus.

In the prior art, the AC/DC adaptor is designed to be capable of supplying the maximum consuming power of a notebook computer to ensure that the notebook computer can be manipulated normally at any condition.

As the operating frequency of the central processor unit (CPU) in the notebook computer is getting higher, the more power will be consumed, thereby requiring more power from the AC/DC adaptor. As a result, the volume and the weight of the AC/DC adaptor have to be increased accordingly. That will disobey the tendency of designing a notebook computer to be thin and small for carrying conveniently nowadays. For this reason, it becomes an important goal to use the AC/DC adaptor more effectively under the principle that devices are designed thin and small.

SUMMARY OF THE INVENTION

It is therefore an object of the invention to provide an electronic apparatus capable of effectively using power of an AC/DC adaptor in order to reduce the volume and the weight of the AC/DC adaptor.

The invention achieves the above-identified objects by providing an electronic apparatus capable of effectively using power of an AC/DC adaptor including a host and an AC/DC adaptor. The AC/DC adaptor is used for receiving an AC power and converting it into a DC power for the host. At the same time, the AC/DC adaptor outputs a controlling signal to control the power consumption of the host according to the power output at that time. The AC/DC adaptor includes a switching power converter for converting the AC power into the DC power, and a power supply controller for outputting a controlling signal according to the power output by the switching power converter.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
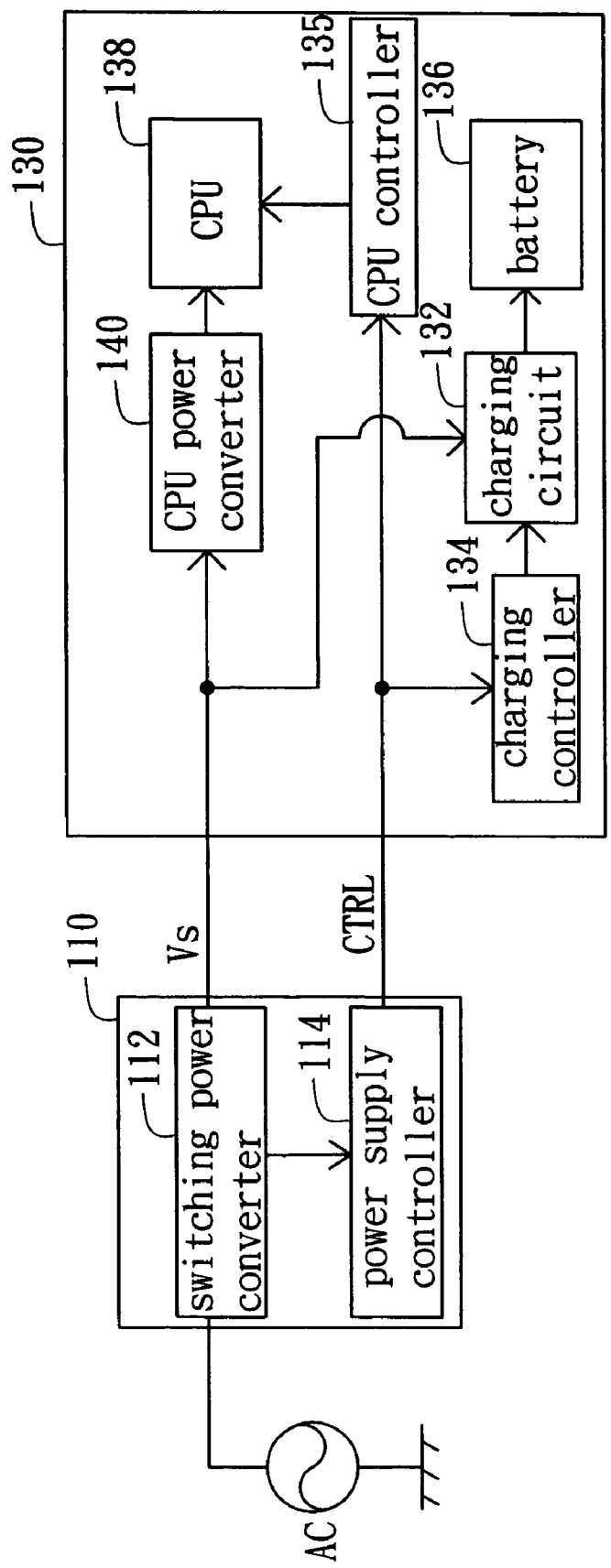
FIG. 1 is a block diagram showing the electronic apparatus capable of effectively using power of an AC/DC adaptor according to a preferred embodiment of the invention.

Referring to FIG. 1, a block diagram of an electronic apparatus capable of effectively using power of an AC/DC adaptor according to a preferred embodiment of the invention is shown. The electronic apparatus includes an AC/DC adaptor 110 and a host 130. The AC/DC adaptor 110 receives an AC power and converts it into a DC power Vs supplied for the host 130. Moreover, the AC/DC adaptor 110 outputs a controlling signal CTRL to control the power consumption of the host 130 according to the power output at that time.

The AC/DC adaptor 110 includes a switching power converter 112 and a power supply controller 114. The switching power converter 112 is used for converting the AC power into the DC power Vs. The power supply controller 114 is used for outputting a controlling signal CTRL according to the power output by the switching power converter 112. If the present power output for the host 130 is too high, the power supply controller 114 will output the controlling signal CTRL to lower the power consumption of the host 130.

The host 130 includes a CPU 138, a CPU power converter 140, a CPU controller 135, a battery 136, a charging circuit 132, and a charging controller 134. The CPU power converter 140 is used for converting the DC power output by the AC/DC adaptor 110 into the voltage required by the CPU 138. The battery 136 is used for supplying a DC power to the host 130. When the AC/DC power converter 140 supplies power for the host 130, it will also charge the battery 136 by way of the charging circuit 132. The controlling signal CTRL is electrically coupled with the CPU controller 135 and the charging controller 134 for controlling the power consumption of the CPU 138 and the battery 136 in the host 130.

The charging controller 134 adjusts the charging current supplied by the charging circuit 132 to the battery 136 according to the controlling signal CTRL. As the controlling signal CTRL shows the power consumption is too high, the charging controller 134 will reduce the charging current flowing from the charging circuit 132 to the battery 136 so as to save the power.

The CPU controller 135 adjusts the operating frequency of the CPU 138 according to the controlling signal CTRL. As the controlling signal CTRL shows the power consumption is too high, the CPU controller will slow down the operating frequency of the CPU 138 so as to save the power.

Figure 2A:
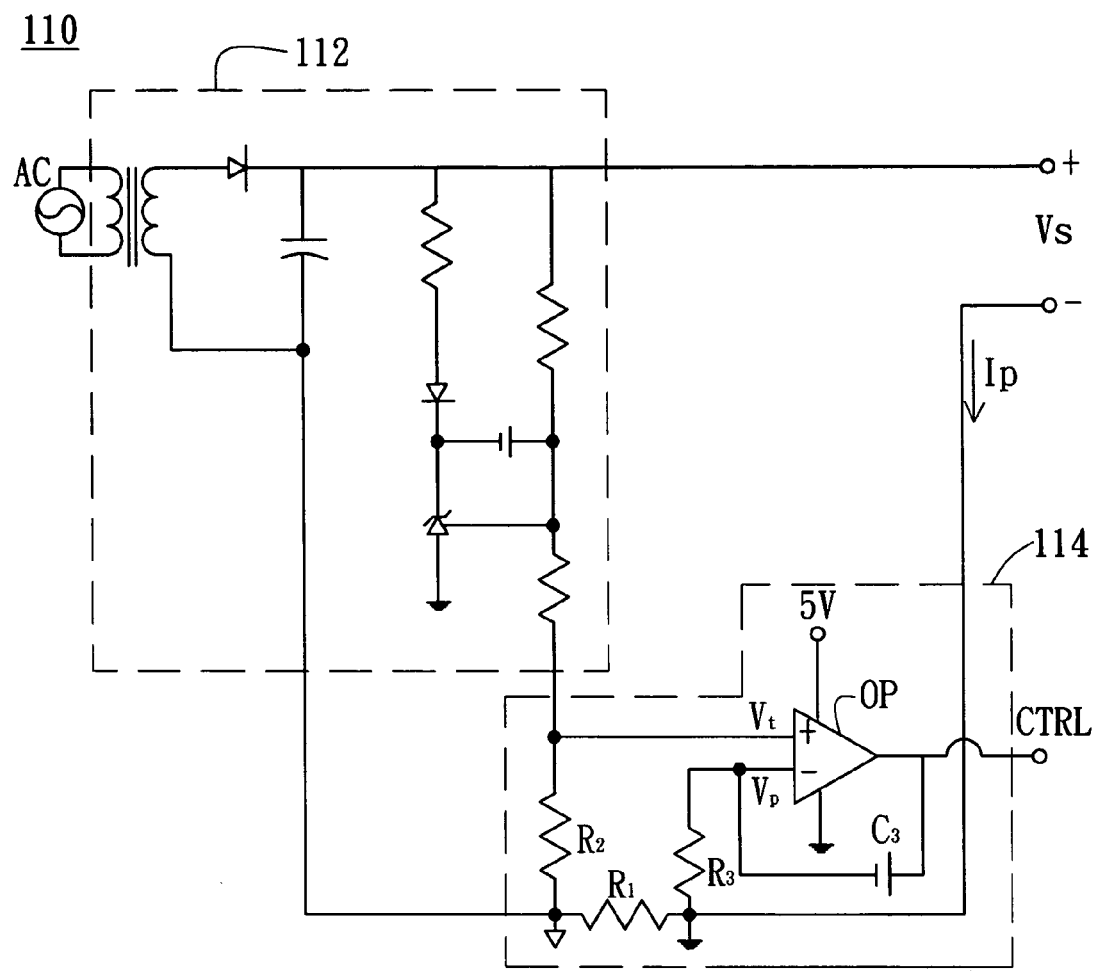
FIG. 2A is a circuit diagram of the AC/DC adaptor in FIG. 1.

Referring to FIG. 2A, a circuit diagram of the AC/DC adaptor 110 in FIG. 1 is shown. The AC/DC adaptor 110 includes a switching power converter 112 and a power supply controller 114. The switching power converter 112 receives the AC power at the input terminal, and outputs the DC power Vs accordingly. The inner circuit of the switching power converter 112 is a prior art that is not further illustrated in the text. The power supply controller 114 includes an operational amplifier OP, resistors R1, R2, R3, and capacitor C3. The operational amplifier OP includes a positive terminal for receiving the threshold voltage Vt, and a negative terminal for receiving the present reference voltage Vp. The power supply controller 114 outputs the controlling signal CTRL after comparing the present reference voltage Vp and the threshold voltage Vt. The threshold voltage Vt is predetermined according to the maximum power output by the AC/DC adaptor 110. For example, the threshold voltage Vt can be given by dividing the voltage Vs, the value of which can be determined by the resistor R2 as shown in FIG. 2A. In addition, the present reference voltage Vp can be given by the voltage drop across the resistor R1 as the loading current Ip flows through the resistor R1. The resistor R3 and the capacitor C3 are used for determining the changing slope of the controlling signal CTRL at that time.

Figure 2B:
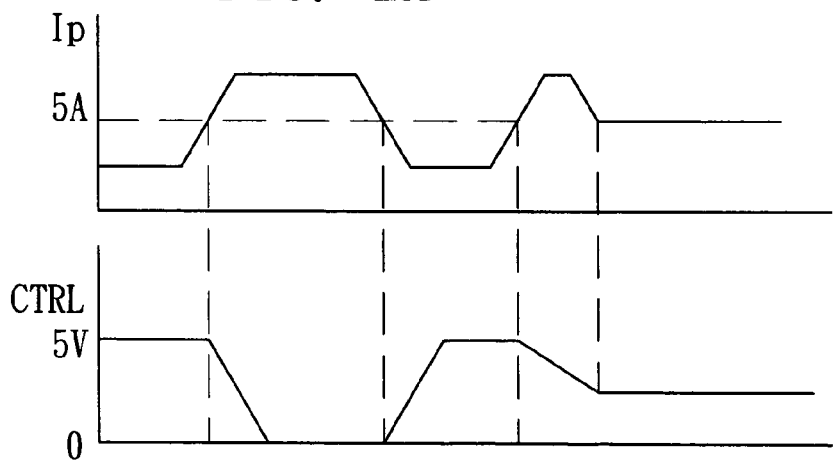
FIG. 2B is a signal diagram of the power supply controller in FIG. 1.

Referring to FIG. 2B, a signal diagram of the power supply controller 114 in FIG. 1 is shown. Take the output voltage Vs to be 19V and the maximum output power to be 95 W as an example. The maximum loading current of the AC/DC adaptor 110 is 95(W)/19(V)=5 A. The threshold voltage Vt is predetermined to be 100 mV, so the value of the resistor R1 should be 0.02 Ω. As the loading current Ip of the AC/DC adaptor 110 is lower than 5 A, the voltage across the resister R1 will be lower than 100 mV, and the controlling signal CTRL will accordingly be at a high voltage level, which means the present power output is lower than the maximum output power. Therefore, it needs no further process for saving power. As the loading current Ip is higher than 5 A, the output CTRL voltage of the operational amplifier OP will change from 5V to 0V, thereby lowering the controlling signal CTRL to a low voltage level, which means the output power is too high at that time. Therefore, a process for saving power will be carried out in the host 130. After the power consumed in the host 130 is lowered, the loading current Ip is reduced. As the loading current Ip is lower than 5 A again, the output CTRL voltage of the operational amplifier OP will change from 0V to 5V, and thus the controlling signal CTRL will return to the high voltage level, where the changing slop is determined by the resistor R3 and the capacitor C3.

Figure 3:
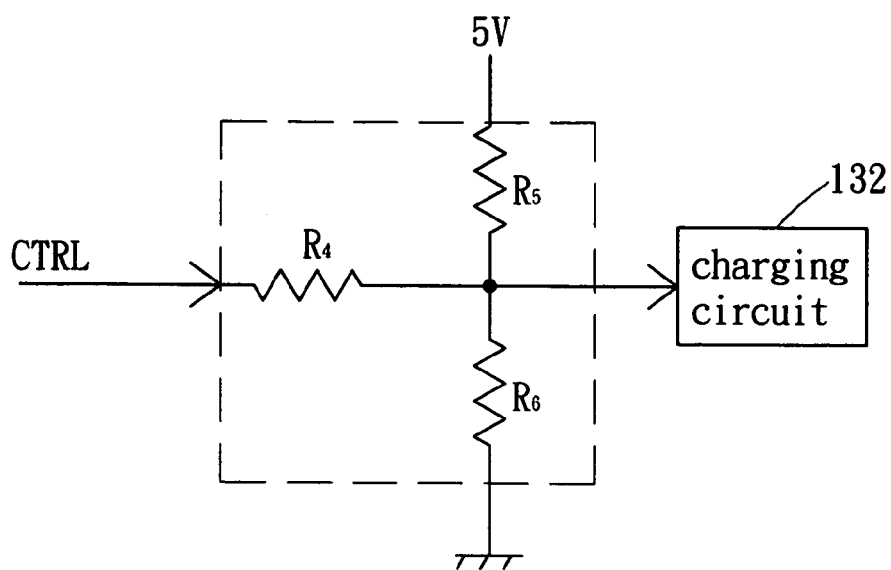
FIG. 3 is a circuit diagram of the charging controller in FIG. 1.

Referring to FIG. 3, a circuit diagram of the charging controller 134 in FIG. 1 is shown. The charging circuit 132, typically, has a controlling pin for controlling the charging current supplied for the battery 136, so the controlling signal CTRL can be connected to the controlling pin directly. The charging controller 134 is a voltage dividing circuit including resistors R4, R5, and R6, for adjusting the charging current according to the voltage level of the controlling signal CTRL. For example, as the controlling signal CTRL is lowered to a low voltage level, the charging current from the charging circuit 132 will be accordingly reduced to save the power.

Figure 4A:
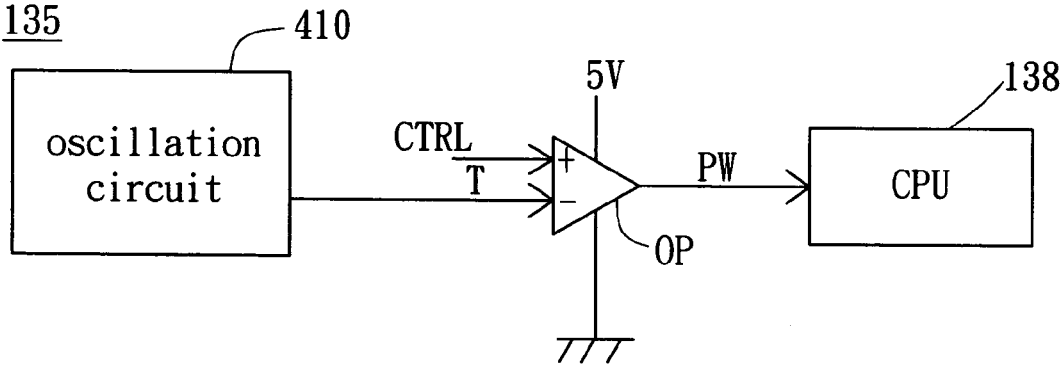
FIG. 4A is a circuit diagram of the CPU controller in FIG. 1.

Referring to FIG. 4A, a circuit diagram of the CPU controller 135 in FIG. 1 is shown. The CPU 138 includes a pin for adjusting the operating frequency. The CPU 138 is operated at a high speed as the pin voltage is at a high level, and at a low speed as the pin voltage is at a low level. The CPU controller 135 includes an oscillation circuit 410 and a comparer CP. The comparer CP has a positive terminal for receiving the controlling signal CTRL, and a negative terminal for receiving the triangular wave T output by the oscillation circuit 410. According to the input signals, the comparer CP outputs an adjusting signal PW for adjusting the operating frequency of the CPU 138.

Figure 4B:
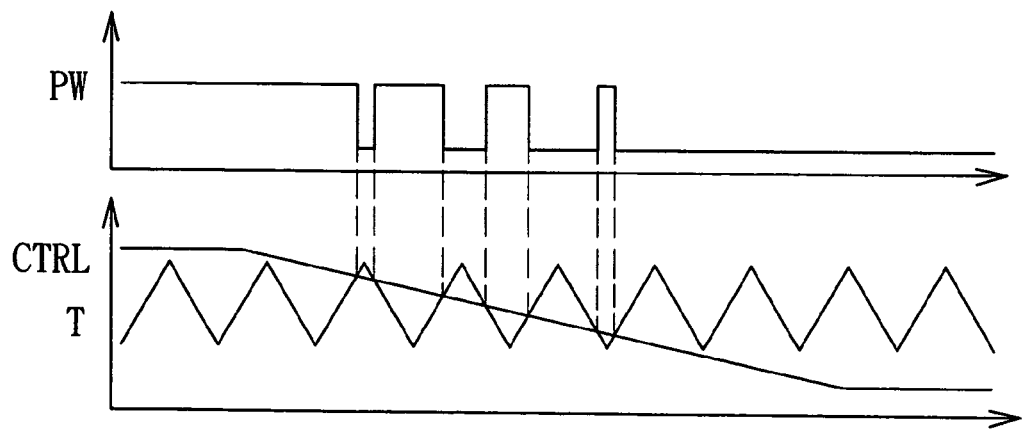
FIG. 4B is a timing diagram of the CPU controller in FIG. 1.

Referring to FIG. 4B, a timing diagram of the CPU controller 135 in FIG. 1 is shown. As the controlling signal CTRL is at the high voltage level, the adjusting signal PW maintains at a high voltage level so that the CPU 138 can be operated at a high speed. As the controlling signal CTRL is getting lowered, the voltage level of the adjusting signal PW will be determined by comparing voltages of the controlling signal CTRL and the triangular wave T. For example, as the voltage level of the controlling signal CTRL is higher than that of the triangular wave T, the adjusting signal PW goes to a high level. As the voltage level of the controlling signal CTRL is lower than that of the triangular wave T, the adjusting signal PW maintains at a low level. For the controlling signal CTRL might have a higher level and a lower level than the triangular wave T by turns, the adjusting signal PW will correspondingly appear to be a pulse wave as shown in FIG. 4B. The CPU 138 is operated at a high speed as the controlling signal CTRL has a high level, and at a low speed as the controlling signal CTRL has a low level. Therefore, the longer the adjusting signal PW maintains at the low level, the more power of the CPU 138 can be saved.

The advantages of the invention are:

(1) Owing that the power output by the AC/DC adaptor in the electronic apparatus can be adjusted automatically, various AC/DC adaptors having different output powers can be used in the electronic apparatus, thereby increasing its utilizing variety.

(2) The output power of the AC/DC adaptor can be designed at a normal power level consumed by the electronic apparatus, without needs to be designed at the maximum consuming power.

(3) The power consumption of the host can be adjusted automatically, so the power of the AC/DC adaptor can be saved, and thus its volume and weight can be reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic apparatus capable of effectively using power of an AC/DC adaptor comprising:
   a host, having a CPU controller and a charging controller; and
   an AC/DC adaptor, for receiving an AC power, converting the AC power into a DC power for the host, and outputting a controlling signal to control power consumption of the host according to the power output at that time, the AC/DC adaptor comprising:
   a switching power converter, for converting the AC power into the DC power; and
   a power supply controller, connecting both the CPU controller and the charging controller for outputting the controlling signal according to the power output by the switching power converter.

2. The apparatus according to claim 1, wherein the host comprises:
   a central processor unit (CPU), wherein the operating frequency of the CPU is adjusted according to an adjusting signal;
   wherein the CPU controller outputs the adjusting signal according to the controlling signal, and the operating frequency of the CPU is lowered by the adjusting signal as the controlling signal shows the power consumption is too high.

3. The apparatus according to claim 2, wherein the CPU controller comprises:
   an oscillation circuit, for outputting a triangular wave; and a comparer, for outputting the adjusting signal according to the controlling signal and the triangular wave.

4. The apparatus according to claim 2, wherein the host further comprises:
a CPU power converter, for converting the DC power output by the AC/DC adaptor into the voltage required by the CPU.

5. The apparatus according to claim 1, wherein the host further comprises:
a charging circuit, for receiving the DC power and determining a charging current to charge a battery according to a charging signal;
wherein the charging signal is output by the charging controller in response to the controlling signal.

6. The apparatus according to claim 5, wherein the charging controller is a voltage dividing circuit.

7. The apparatus according to claim 1, wherein the power supply controller comprises:
an operational amplifier, for receiving a present reference voltage and a preset threshold voltage, the operational amplifier outputting the controlling signal after comparing the present reference voltage and the threshold voltage;
wherein the threshold voltage is preset according to the maximum power output by the AC/DC adaptor, and the present reference voltage is given according to the loading current of the AC/DC adaptor.

8. The apparatus according to claim 7, wherein the threshold voltage is given according to the output voltage of the AC/DC adaptor.

9. An electronic apparatus capable of effectively using power of an AC/DC adaptor, comprising:
an AC/DC adaptor, for receiving an AC power, converting the AC power into a DC power, and outputting a controlling signal according to the power output at that time, the AC/DC adaptor comprising:
a switching power converter, for converting the AC power into the DC power; and
a power supply controller, for outputting the controlling signal according to the power output by the switching power converter; and
a host, operated by the DC power, wherein the power consumed by the host is adjusted according to the controlling signal, the host comprising:
a CPU, the operating frequency of the CPU being adjusted according to an adjusting signal;
a CPU controller, for outputting the adjusting signal according to the controlling signal, wherein the operating frequency of the CPU is lowered by the adjusting signal as the controlling signal shows the power consumption is too high;
a battery, for receiving a charging current;
a charging controller, for receiving the controlling signal and outputting a charging signal accordingly; and
a charging circuit, for receiving the DC power and determining the charging current according to the charging signal;
wherein the power supply controller connects both the CPU controller and the charging controller.

10. The apparatus according to claim 9, wherein the CPU controller comprises:
an oscillation circuit, for outputting a triangular wave; and
a comparer, for outputting the adjusting signal according to the controlling signal and the triangular wave.

11. The apparatus according to claim 9, wherein the host further comprises:
a CPU power converter, for converting the DC power output by the AC/DC adaptor into the voltage required by the CPU.

12. The apparatus according to claim 9, wherein the charging controller is a voltage dividing circuit.

13. The apparatus according to claim 9, wherein the power supply controller comprises:
an operational amplifier, for receiving a present reference voltage and a preset threshold voltage, the operational amplifier outputting the controlling signal after comparing the present reference voltage and the threshold voltage;
wherein the threshold voltage is preset according to the maximum power output by the AC/DC adaptor, and the present reference voltage is given according to the loading current of the AC/DC adaptor.

14. The apparatus according to claim 13, wherein the threshold voltage is given according to the output voltage of the AC/DC adaptor.

* * * * *